United States Patent
Galella

[19]

[11] Patent Number: 5,909,868
[45] Date of Patent: Jun. 8, 1999

[54] CARPET REMOVAL TOOL

[76] Inventor: Rodney Galella, 885A Conklin St., Farmingdale, N.Y. 11735

[21] Appl. No.: 08/905,851

[22] Filed: Aug. 4, 1997

[51] Int. Cl.$^6$ .............................. B25B 25/00; B32B 35/00
[52] U.S. Cl. ........................................... 254/211; 156/584
[58] Field of Search ................... 254/200–212, 254/113, 119; 156/584, 344

[56] References Cited

U.S. PATENT DOCUMENTS

| | | |
|---|---|---|
| 177,977 | 5/1876 | Young . |
| 329,136 | 10/1885 | Camp . |
| 370,902 | 10/1887 | Stockdale .............................. 254/211 |
| 456,001 | 7/1891 | Hinkle .................................. 254/211 |
| 466,749 | 1/1892 | Case .................................... 254/211 |
| 498,977 | 6/1893 | Harvey .................................. 254/211 |
| 644,323 | 2/1900 | Greenawalt . |
| 772,980 | 10/1904 | Verheul ................................ 254/209 |
| 3,790,976 | 2/1974 | Stencil . |
| 4,906,323 | 3/1990 | Thomas ................................ 156/584 |
| 5,387,308 | 2/1995 | Heavrin ............................... 156/584 |
| 5,415,725 | 5/1995 | Scharf ................................. 156/584 |
| 5,505,433 | 4/1996 | Carmichael et al. ................. 254/211 |

*Primary Examiner*—John M. Jillions
*Attorney, Agent, or Firm*—Michael I. Kroll

[57] ABSTRACT

A carpet removal tool (10) comprising a base skid (12) to sit upon a carpet (14) glued upon a substrate (16). An elongate handle (18) has a handgrip (20) on a top end. A facility (22) is for pivoting a bottom end of the elongate handle (18) in the base skid (12). A mechanism (24) is for gripping an edge of the carpet (14). A structure (26) is for attaching the gripping mechanism (24) in a height adjustable manner to the elongate handle (18). A person (28) can stand with one foot (30) upon the base skid (12), grasp the handgrip (20) with both hands (32) to pivot the elongate handle (18) on the base skid (12) and pull the carpet (14) with the gripping mechanism (24) away from the substrate (16).

16 Claims, 9 Drawing Sheets

CARPET REMOVAL TOOL

BACKGROUND OF THE INVENTION

1. Field of the Invention

The instant invention relates generally to carpet implements and more specifically it relates to a carpet removal tool. The carpet removal tool is used for the purpose of ripping up carpeting which has been glued to a substrate.

2. Description of the Prior Art

Numerous carpet implements have been provided in prior art. For example, U.S. Pat. Nos. 177,977 to Young; 329,136 to Camp; 644,323 to Greenawalt and 3,790,976 to Stencil all are illustrative of such prior art. While these units may be suitable for the particular purpose to which they address, they would not be as suitable for the purposes of the present invention as heretofore described.

SUMMARY OF THE INVENTION

A primary object of the present invention is to provide a carpet removal tool that will overcome the shortcomings of the prior art devices.

Another object is to provide a carpet removal tool that is used for the purpose of ripping up carpeting which has been glued to a substrate.

An additional object is to provide a carpet removal tool in which its function is to use leverage as a force, whereby the carpet is ripped up more easily, safely and efficiently.

A further object is to provide a carpet removal tool that is simple and easy to use.

A still further object is to provide a carpet removal tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Turning now descriptively to the drawings, in which similar reference characters denote similar elements throughout the several views, FIGS. 1 through 9 illustrate a carpet removal tool 10 of the present invention. With regard to the reference numerals used, the following numbering is used throughout the various drawing figures.

| | |
|---|---|
| 10 | carpet removal tool |
| 12 | base skid of 10 |
| 14 | carpet |
| 16 | substrate |
| 18 | elongate handle of 10 |
| 20 | handgrip on 18 |
| 22 | pivoting facility of 10 |
| 24 | gripping mechanism of 10 |
| 26 | attaching structure of 10 |
| 28 | person |
| 30 | foot of 28 |
| 32 | hand of 28 |
| 34 | Y-shaped frame of 12 |
| 36 | front ski on 34 |
| 38 | rear ski on 34 |
| 40 | foot plate of 12 |
| 42 | grasping teeth on 40 |
| 44 | spring biased shaft of 12 |
| 46 | non-slip ridges on 40 |
| 48 | foot strap on 40 |
| 50 | stop on 34 |
| 52 | reinforcement casing on 18 |
| 54 | aperture in 12 for 22 |
| 56 | cylindrical rod for 22 |
| 58 | stationary lower plate of 24 |
| 60 | pointed tooth of 58 |
| 62 | movable intermediate plate of 24 |
| 64 | hole in 62 |
| 66 | movable upper plate of 24 |
| 68 | rounded opposing tooth of 66 |
| 70 | lever of 24 |
| 72 | spring biased shaft for 70 |
| 74 | sleeve of 26 |
| 76 | transverse bore in 18 |
| 78 | trigger of 26 in 74 |
| 80 | forked arm of 78 |
| 82 | right angle projection on 80 |
| 84 | pivot post of 78 |
| 86 | spring of 78 |
| 88 | pistol grip on 26 |

The carpet removal tool 10 comprises a base skid 12 to sit upon carpet 14 glued upon a substrate 16. An elongate handle 18 has a handgrip 20 on a top end. A facility 22 is for pivoting a bottom end of the elongate handle 18 in the base skid 12. A mechanism 24 is for gripping an edge of the carpet 14. A structure 26 is for attaching the gripping mechanism 24 in a height adjustable manner to the elongate handle 18. A person 28 can stand with one foot 30 upon the base skid 12, grasp the handgrip 20 with both ahnds 32 to pivot the elongate handle 18 on the base skid 12 and pull the carpet 14 with the gripping mechanism 24 away from the substrate 16.

The base skid 12 includes a Y-shaped frame 34 having a front ski 36 and a pair of rear skis 38 to slide upon the carpet 14. A foot plate 40 has grasping teeth 42 extending downwardly from a bottom surface. A spring biased shaft 44 extends through a rear portion of the Y-shaped frame 34 and a rear portion of the foot plate 40, to normally keep the grasping teeth 42 on the foot plate 40 elevated about the carpet 14. When the person 28 places the foot 30 on the foot plate 40 and presses downwardly, the grasping teeth 42 will engage with the carpet 14 to prevent the base skid 12 from sliding upon the carpet 14.

Figure 7:
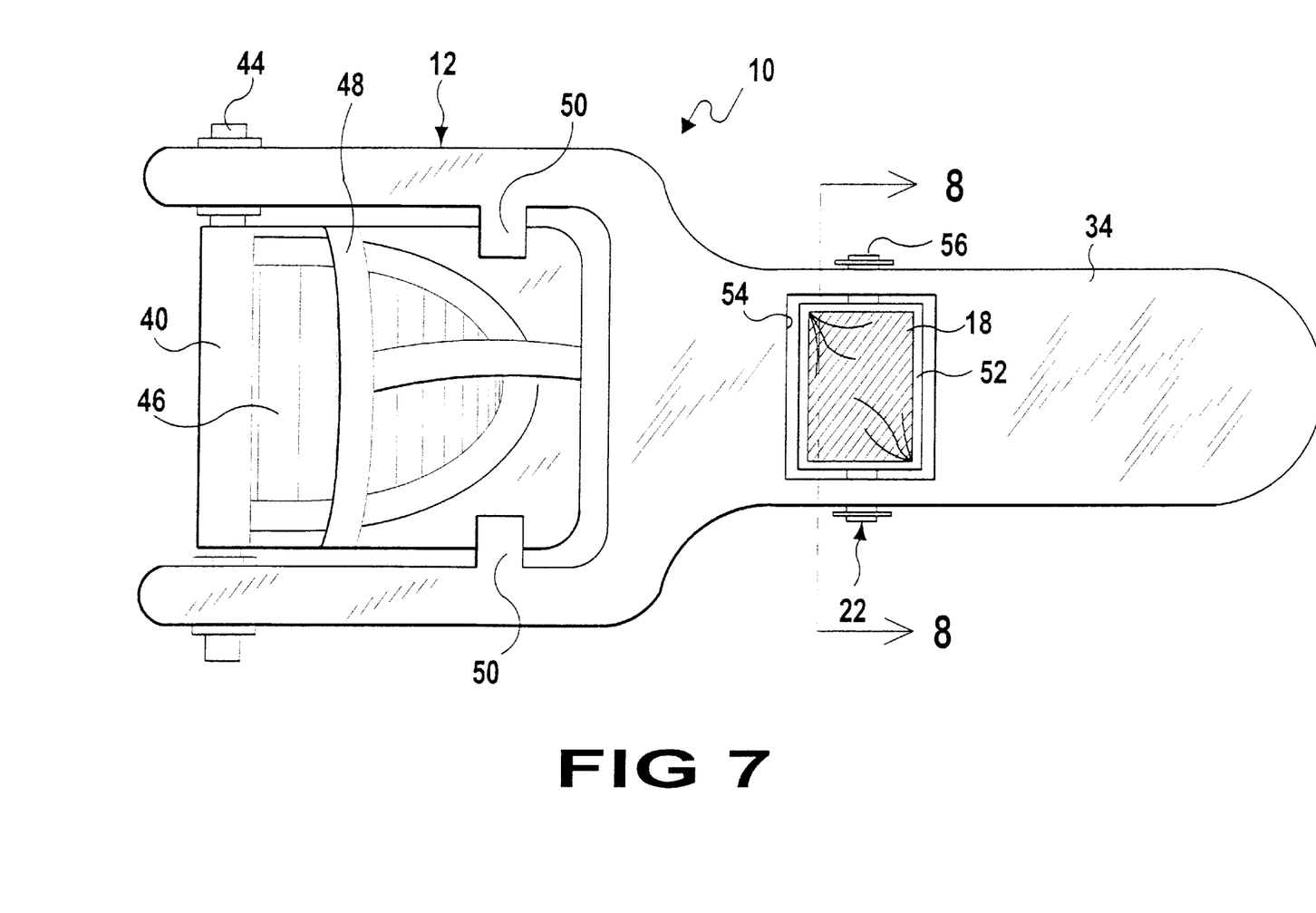
FIG. 7 is a top plan view of the base skid portion taken in the direction of arrow 7 in FIG. 6.
Figure 8:
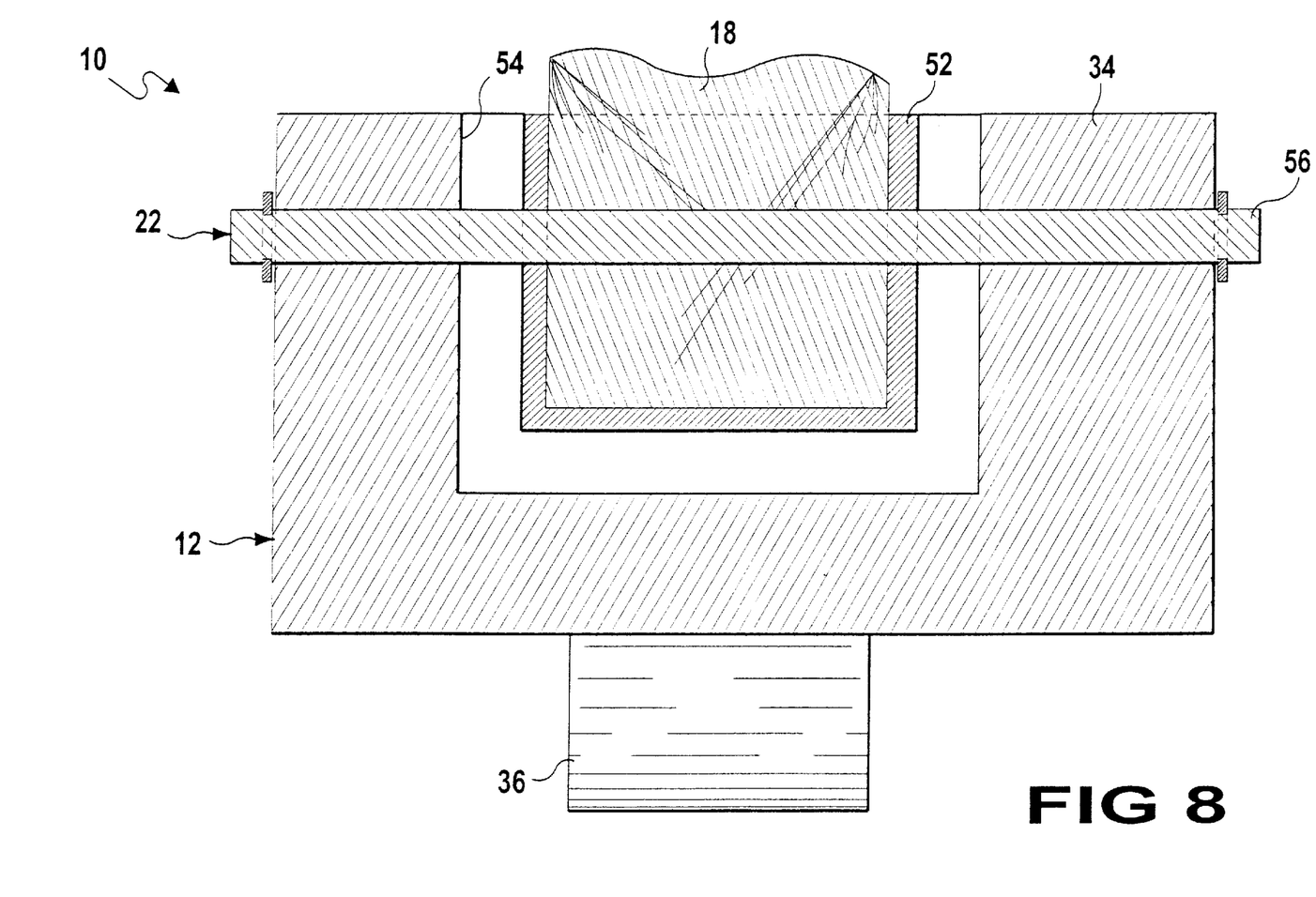
FIG. 8 is a cross sectional view taken along line 8—8 in FIG. 7.

The base skid 12, as best seen in FIG. 7, consists of the foot plate 40 having a plurality of non-slip ridges 46 upon a top surface thereof. A foot strap 48 is secured onto the top surface of the foot plate 40, to help maintain the foot 30 of the person 28 upon the foot plate 40. A pair of stops 50 extend inwardly from the frame 34 above the rear skis 38, to normally keep the foot plate 40 level and elevated above the carpet 14.

The elongate handle 18 includes a reinforcement casing 52 secured to the bottom end thereof, to strengthen the elongate handle 18. The pivoting facility 22 consists of the base skid 12 having an aperture 54 therethrough. A cylindrical rod 56 is maintained and extends transversely through the aperture 54 in the base skid 12, through the reinforcement casing 52 and the bottom end of the elongate handle 18. The aperture 54 in the base skid 12 is larger than the reinforcement casing 52, to allow the elongate handle 18 to pivot upon the cylindrical rod 56.

The gripping mechanism 24 includes a stationary lower plate 58, having a plurality of pointed teeth 60 extending at an angle upwardly from a top surface. A movable intermediate plate 62 has a plurality of holes 64 therethrough, so that the pointed teeth 60 can extend through the holes 64. A movable upper plate 66 has a plurality of rounded opposing teeth 68 extending downwardly at an opposite angle from a bottom surface. A lever 70 is rotatively mounted and spring biased at 72 to the stationary lower plate 58. The lever 70 can be operated to a closed position, as in FIGS. 1, 2 and 9, to grip the carpet 14 to a first open position, as in FIG. 3, to place the carpet 14 between the movable intermediate plate 62 and the movable upper plate 66 and a fully open position, as in FIG. 4, to allow the carpet 14 to be removed from between the movable intermediate plate 62 and the movable upper plate 66.

The attaching structure 26 consists of a sleeve 74 to fit upon the elongate handle 18. The elongate handle 18 has a plurality of spaced apart transverse bores 76 along one side thereof. A trigger 78 is in the sleeve 78, to engage with any one of the transverse bores 76 in the elongate handle 18.

Figure 1:
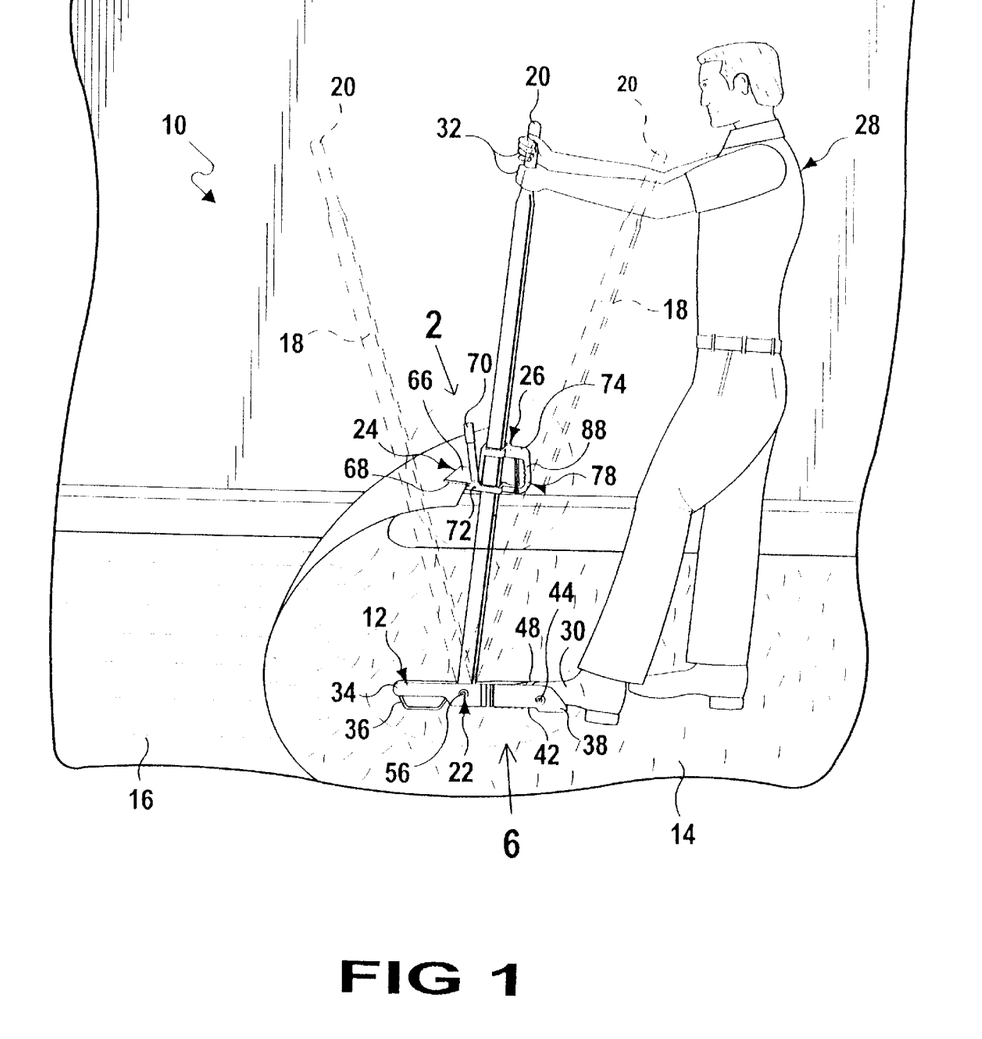
FIG. 1 is a perspective view of the instant invention in use.
Figure 2:
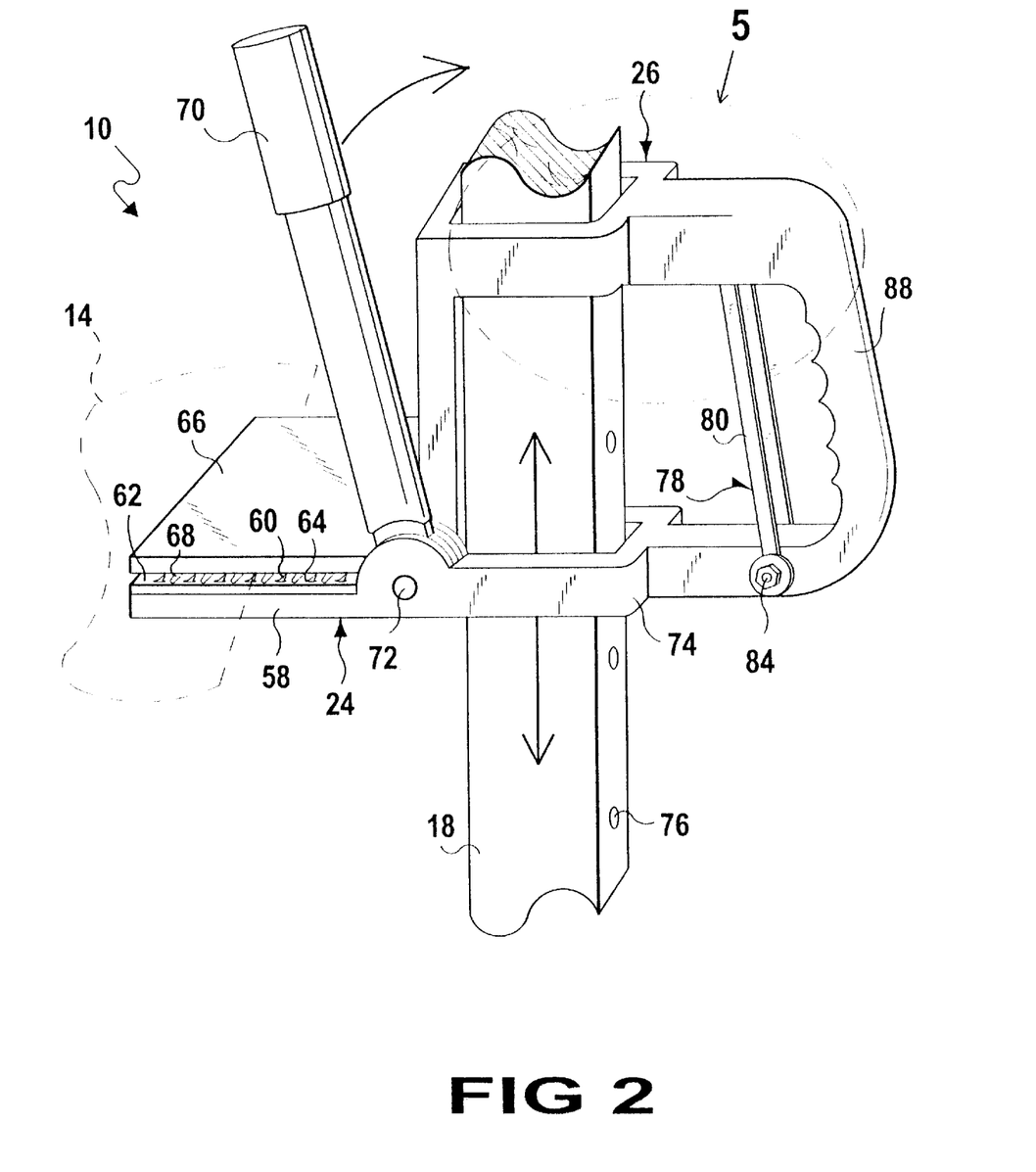
FIG. 2 is an enlarged perspective view of an area as indicated by arrow 2 in FIG. 1, showing the adjustable carpet gripping mechanism in a closed position, gripping the carpet shown in dashed lines.
Figure 3:
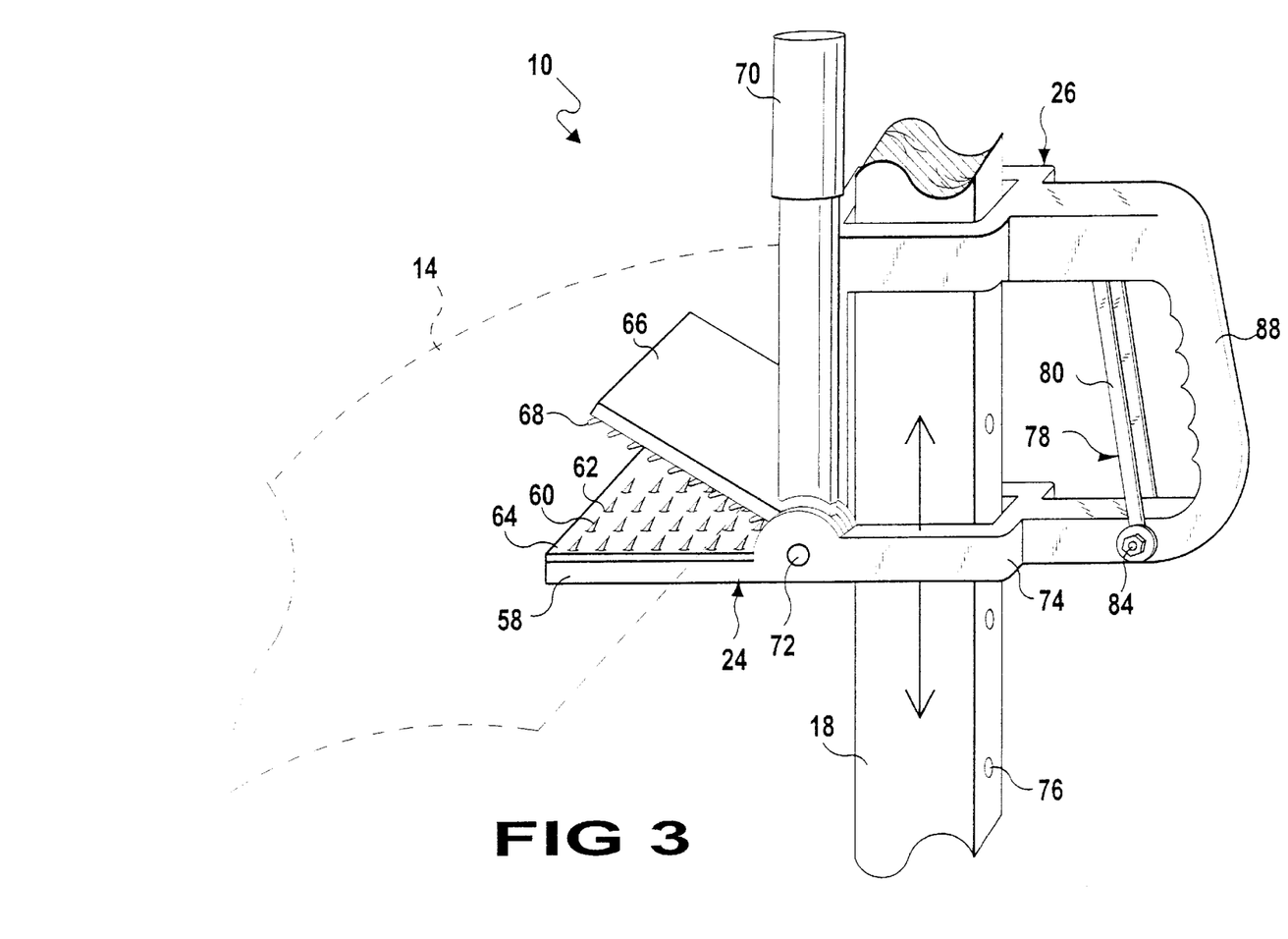
FIG. 3 is an enlarged perspective view similar to FIG. 2, showing the adjustable carpet gripping mechanism in a first open position, receiving the carpet therein.
Figure 4:
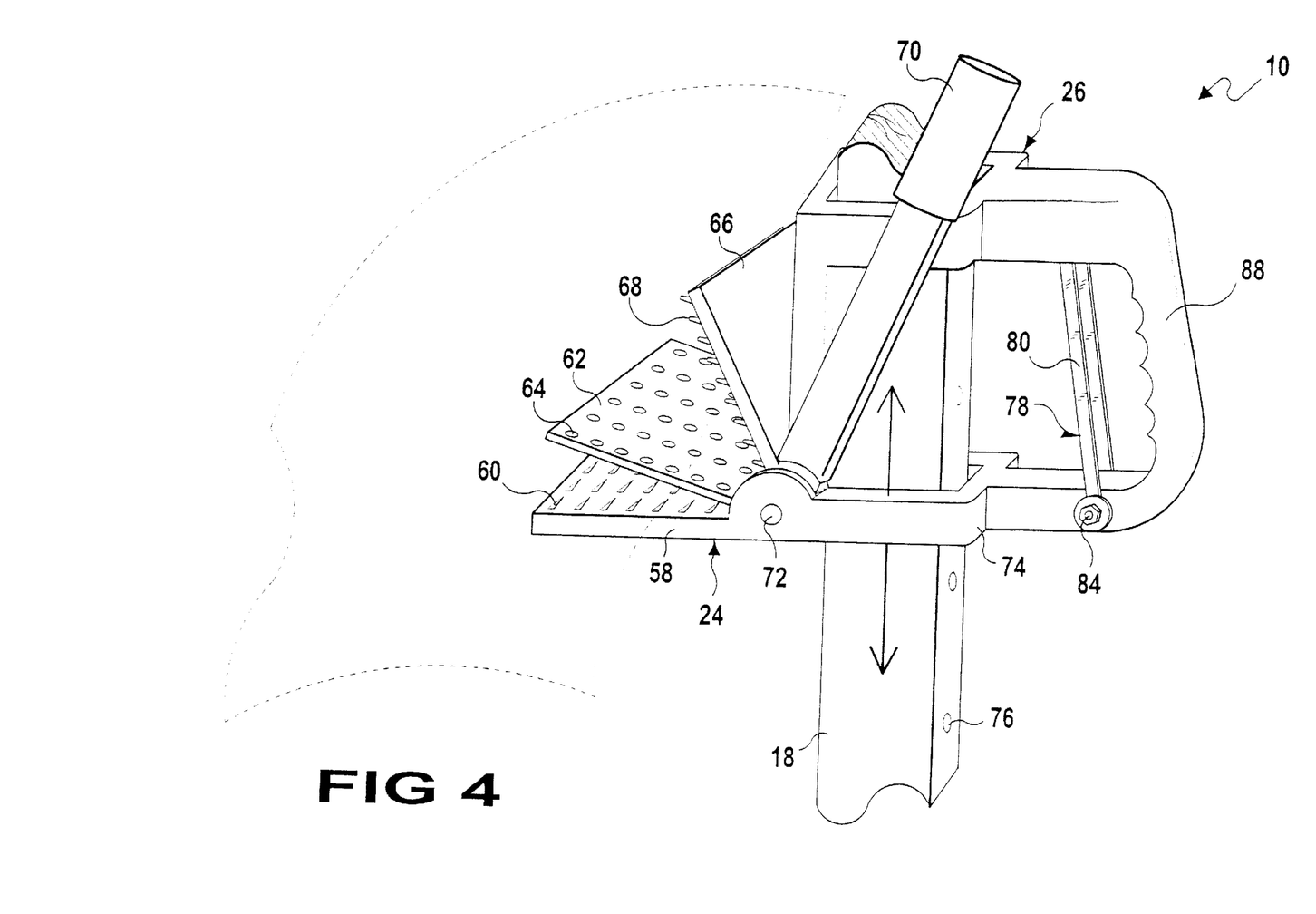
FIG. 4 is an enlarged perspective view similar to FIG. 2, showing the adjustable carpet gripping mechanism in a fully opened position and the carpet shown in dashed lines ready to be removed from the lower plate.
Figure 5:
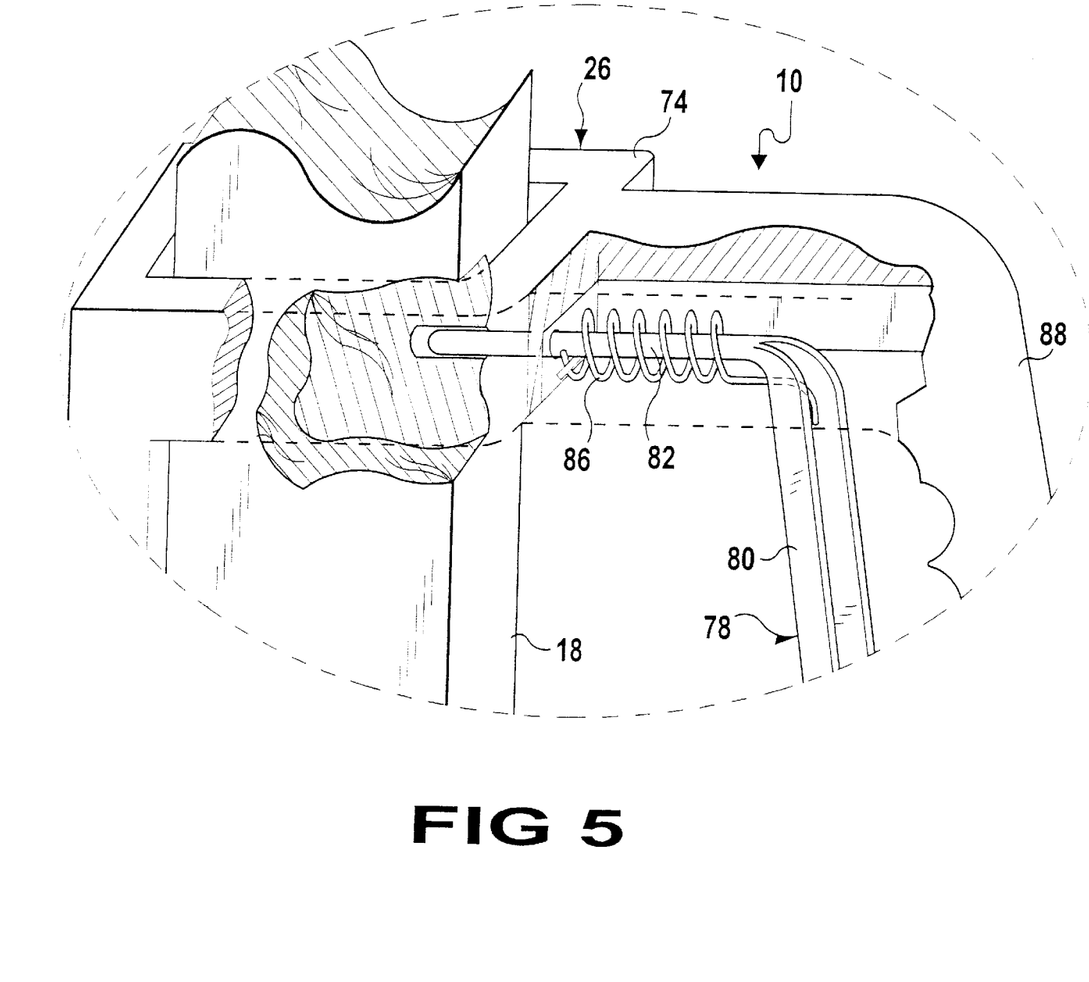
FIG. 5 is a further enlarged perspective view of an area as indicated by arrow 5 in FIG. 2, with parts broken away and in section, showing the spring biased holding member in greater detail.
Figure 6:
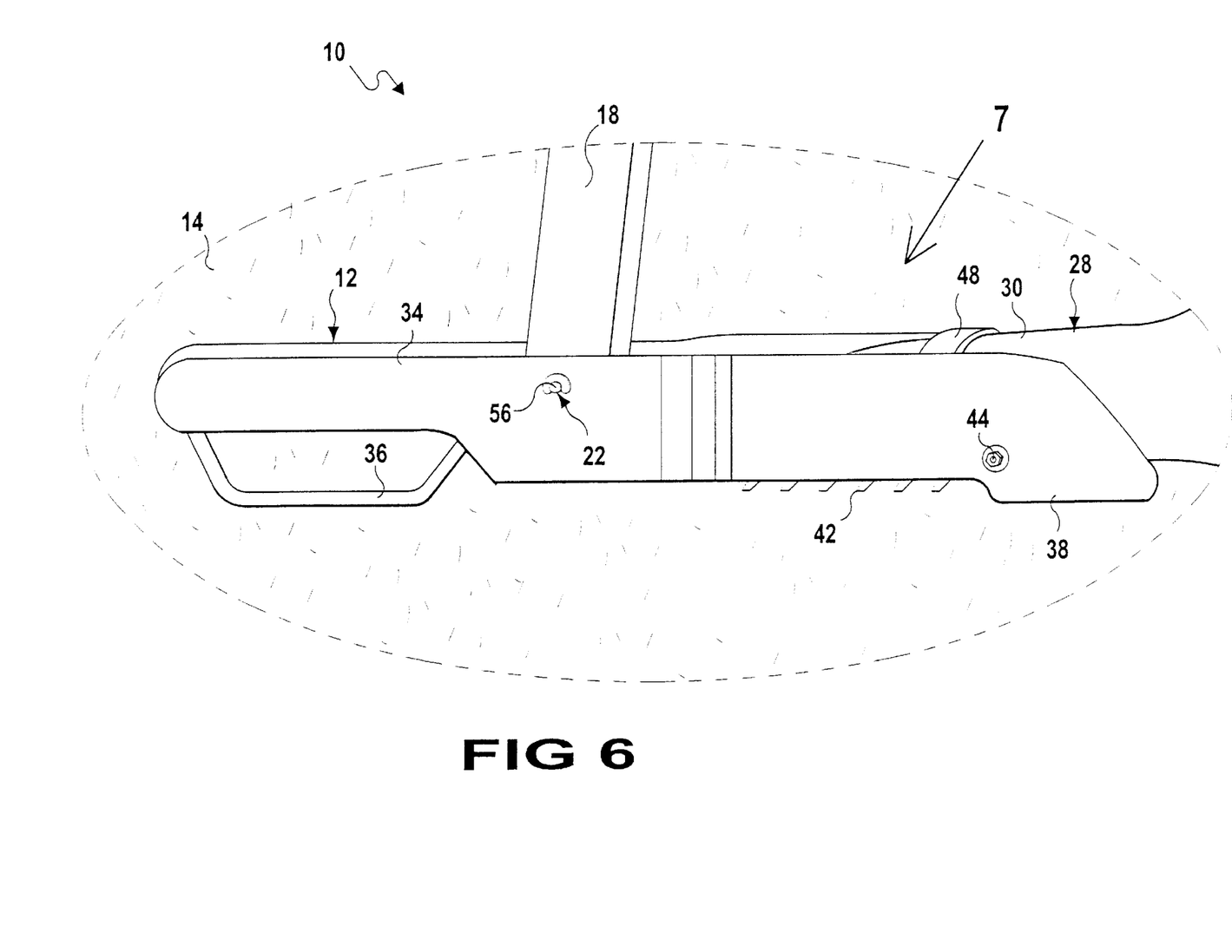
FIG. 6 is an enlarged perspective view of an area as indicated by arrow 5 in FIG. 1, showing the base skid portion in greater detail.

The trigger 78, as best seen in FIG. 5, includes a forked arm 80 having a right angle projection 82 on an upper end thereof. A pivot post 84 at a lower end of the forked arm 80 extends into the sleeve 74, to allow the forked arm 80 to swing on the pivot post 84, so that the right angle projection 82 can enter into one of the transverse bores 76 in the elongate handle 18. A spring 86 is provided to normally keep the right angle projection 82 within one of the transverse bores 76 in the elongate handle 18, until a hand 32 of the person 28 pulls the forked arm 80 back to release the right angle projection 82.

The attaching structure 26 further contains a pistol grip 88 adjacent the trigger 78. The hand 32 of the person 28 can grasp the pistol grip 86, to slide the sleeve 74 up and down upon the elongate handle 18.

Figure 9:
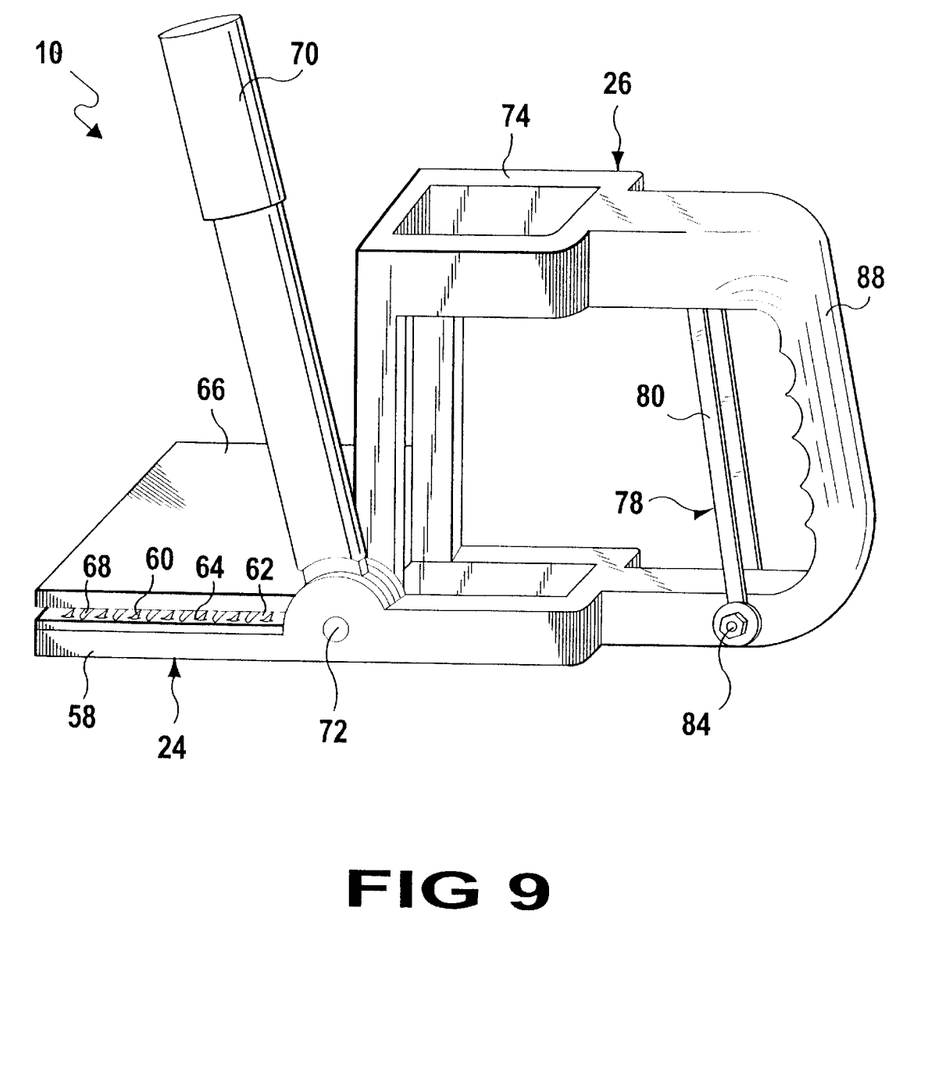
FIG. 9 is an enlarged perspective view of the adjustable carpet gripping member per se, which can be used by itself.

In FIG. 9, the carpet removal tool 10 is shown with the base skid 12 and the elongate handle 18 removed therefrom.

The gripping mechanism 24 can still be operated to engage with the edge of the carpet 14. The person 28 will now grasp the pistol grip 86 by the hand 32 and then pull the carpet 14 away from the substrate 16.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A carpet removal tool comprising:
   a) a base skid to sit upon a carpet glued upon a substrate, wherein said base skid includes a Y-shaped frame having a front ski and a pair of rear skis to slide upon the carpet, a foot plate having grasping teeth extending downwardly from a bottom surface and a spring biased shaft to extend through a rear portion of said Y-shaped frame and a rear portion of said foot plate to normally keep said grasping teeth on said foot plate elevated above the carpet, so that when the person places the foot on said foot plate and presses downwardly said grasping teeth will engage with the carpet to prevent said base skid from sliding upon the carpet;
   b) an elongate handle having a handgrip on a top end;
   c) means for pivoting a bottom end of said elongate handle in said base skid;
   d) means for gripping an edge of the carpet; and
   e) means for attaching said gripping means in a height adjustable manner to said elongate handle, so that a person can stand with one foot upon said base skid, grasp said handgrip with both hands to pivot said elongate handle on said base skid and pull the carpet with said gripping means away from the substrate.

2. A carpet removal tool as recited in claim 1, wherein said base skid further includes:
   a) said foot plate having a plurality of non-slip ridges upon a top surface thereof; and
   b) a foot strap secured onto the top surface of said foot plate to help maintain the foot of the person upon said foot plate.

3. A carpet removal tool as recited in claim 2, wherein said base skid further includes a pair of stops extending inwardly from said frame above said rear skis to normally keep said foot plate level and elevated above the carpet.

4. A carpet removal tool as recited in claim 3, wherein said elongate handle includes a reinforcement casing secured to said bottom end thereof, to strengthen said elongate handle.

5. A carpet removal tool as recited in claim 4, wherein said pivoting means includes:
   a) said base skid having an aperture therethrough; and
   b) a cylindrical rod maintained and extending transversely through said aperture in said base skid, through said reinforcement casing and said bottom end of said elongate handle, whereby said aperture in said base skid is larger than said reinforcement casing, to allow said elongate handle to pivot upon said cylindrical rod.

6. A carpet removal tool as recited in claim 5, wherein said gripping means includes:
   a) a stationary lower plate having a plurality of pointed teeth extending at an angle upwardly from a top surface;
   b) a movable intermediate plate having a plurality of holes therethrough, so that said pointed teeth can extend through said holes;
   c) a movable upper plate having a plurality of rounded opposing teeth extending downwardly at an opposite angle from a bottom surface; and
   d) a lever rotatively mounted and spring biased to said stationary lower plate, so that said lever can be operated to a closed position to grip the carpet, to a first open position to place the carpet between said movable intermediate plate and said movable upper plate and a fully open position to allow the carpet to be removed from between said movable intermediate plate and said movable upper plate.

7. A carpet removal tool as recited in claim 6, wherein said attaching means includes:
   a) a sleeve to fit upon said elongate handle;
   b) said elongate handle having a plurality of spaced apart transverse bores along one side thereof; and
   c) a trigger in said sleeve to engage with any one of said transverse bores in said elongate handle.

8. A carpet removal tool as recited in claim 7, wherein said trigger includes:
   a) a forked arm having a right angle projection on an upper end thereof;
   b) a pivot post at a lower end of said forked arm to extend into said sleeve, to allow said forked arm to swing on said pivot post, so that said right angle projection can enter into one of said transverse bores in said elongate handle; and
   c) a spring to normally keep said right angle projection within one of said transverse bores in said elongate handle, until a hand of the person pulls said forked arm back to release said right angle projection.

9. A carpet removal tool as recited in claim 8, wherein said attaching means further includes a pistol grip adjacent said trigger, so that the hand of the person can grasp said pistol grip to slide said sleeve up and down upon said elongate handle.

10. A carpet removal tool as recited in claim 1, wherein said base skid further includes a pair of stops extending inwardly from said frame above said rear skis to normally keep said foot plate level and elevated above the carpet.

11. A carpet removal tool as recited in claim 1, wherein said elongate handle includes a reinforcement casing secured to said bottom end thereof, to strengthen said elongate handle.

12. A carpet removal tool as recited in claim 11, wherein said pivoting means includes:
   a) said base skid having an aperture therethrough; and
   b) a cylindrical rod maintained and extending transversely through said aperture in said base skid, through said reinforcement casing and said bottom end of said elongate handle, whereby said aperture in said base skid is larger than said reinforcement casing, to allow said elongate handle to pivot upon said cylindrical rod.

13. A carpet removal tool as recited in claim 1, wherein said gripping means includes:
   a) a stationary lower plate having a plurality of pointed teeth extending at an angle upwardly from a top surface;
   b) a movable intermediate plate having a plurality of holes therethrough, so that said pointed teeth can extend through said holes;
   c) a movable upper plate having a plurality of rounded opposing teeth extending downwardly at an opposite angle from a bottom surface; and
   d) a lever rotatively mounted and spring biased to said stationary lower plate, so that said lever can be operated to a closed position to grip the carpet, to a first open position to place the carpet between said movable intermediate plate and said movable upper plate and a fully open position to allow the carpet to be removed from between said movable intermediate plate and said movable upper plate.

14. A carpet removal tool as recited in claim 1, wherein said attaching means includes:
   a) a sleeve to fit upon said elongate handle;
   b) said elongate handle having a plurality of spaced apart transverse bores along one side thereof; and
   c) a trigger in said sleeve to engage with any one of said transverse bores in said elongate handle.

15. A carpet removal tool as recited in claim 14, wherein said trigger includes:
   a) a forked arm having a right angle projection on an upper end thereof;
   b) a pivot post at a lower end of said forked arm to extend into said sleeve, to allow said forked arm to swing on said pivot post, so that said right angle projection can enter into one of said transverse bores in said elongate handle; and
   c) a spring to normally keep said right angle projection within one of said transverse bores in said elongate handle, until a hand of the person pulls said forked arm back to release said right angle projection.

16. A carpet removal tool as recited in claim 14, wherein said attaching means further includes a pistol grip adjacent said trigger, so that the hand of the person can grasp said pistol grip to slide said sleeve up and down upon said elongate handle.

* * * * *